(12) United States Patent
Fu et al.

(10) Patent No.: US 8,422,206 B2
(45) Date of Patent: Apr. 16, 2013

(54) CONSUMER ELECTRONIC PRODUCT ASSEMBLY WITH BRACKET

(75) Inventors: Meng Fu, Shenzhen (CN); Bang-Jie Xie, Shenzhen (CN); Chun-Chi Chen, Taipei Hsien (TW)

(73) Assignees: Fu Zhun Precision Industry (Shen Zhen) Co., Ltd., Shenzhen (CN); Foxconn Technology Co., Ltd., New Taipei (TW)

( * ) Notice: Subject to any disclaimer, the term of this patent is extended or adjusted under 35 U.S.C. 154(b) by 283 days.

(21) Appl. No.: 12/914,990

(22) Filed: Oct. 28, 2010

(65) Prior Publication Data

US 2012/0057278 A1     Mar. 8, 2012

(30) Foreign Application Priority Data

Sep. 3, 2010   (CN) .......................... 2010 1 0272116

(51) Int. Cl.
*H05K 7/16*        (2006.01)

(52) U.S. Cl.
USPC ............... 361/679.01; 361/679.41; 248/276.1

(58) Field of Classification Search ............. 361/679.41, 361/679.55, 679.01–679.61; 710/303–305; 455/575.1–575.4; 379/433.11–433.13
See application file for complete search history.

(56) References Cited

U.S. PATENT DOCUMENTS

| | | | | |
|---|---|---|---|---|
| 5,899,421 | A  * | 5/1999  | Silverman | 248/175 |
| 6,716,058 | B2 * | 4/2004  | Youn | 439/535 |
| 7,479,902 | B2 * | 1/2009  | Wang et al. | 341/22 |
| 7,808,779 | B2 * | 10/2010 | Lum et al. | 361/679.43 |
| 7,810,222 | B2 * | 10/2010 | Ward et al. | 29/410 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

A consumer electronic product assembly includes a consumer electronic product and a bracket holding the consumer electronic product. The bracket includes a supporting seat, a holding member and a connecting bar. The holding member holds the consumer electronic product. Opposite ends of the connecting bar hinge on the holding member and the supporting seat, respectively. The connecting bar is rotatable with respect to the supporting seat, and the holding member is rotatable with respect to the connecting bar, whereby the consumer electronic product held by the holding member can be adjusted to various positions with respect to the supporting seat.

14 Claims, 7 Drawing Sheets

CONSUMER ELECTRONIC PRODUCT ASSEMBLY WITH BRACKET

CROSS-REFERENCE TO RELATED APPLICATION

This application is related to a co-pending application entitled "ELECTRONIC DEVICE ASSEMBLY WITH TWO-PART BRACKET" Ser. No. 12/914,988, assigned to the same assignee of this application and filed on the same date as this application. The related application is incorporated herein by reference.

BACKGROUND

1. Technical Field

The present disclosure relates to electronic products, and more particularly to a consumer electronic product assembly having a consumer electronic product and a bracket for supporting the consumer electronic product.

2. Description of Related Art

As consumer electronic products continue to develop, portable AV (audiovisual) products are becoming widely used. These portable AV products include LCDs (liquid crystal displays), portable DVD (digital video disc) players, tablet PCs, mobile phones, etc. A bracket is generally used to support the portable AV product on a desk or another kind of supporting surface. However, the bracket is secured on the portable AV product and cannot change its position with respect to the portable AV product. Such portable AV products cannot meet consumers' requirements for displaying of the video image at different orientations.

It is desirable to provide a consumer electronic product assembly which can overcome the described limitations.

DETAILED DESCRIPTION

Figure 1:
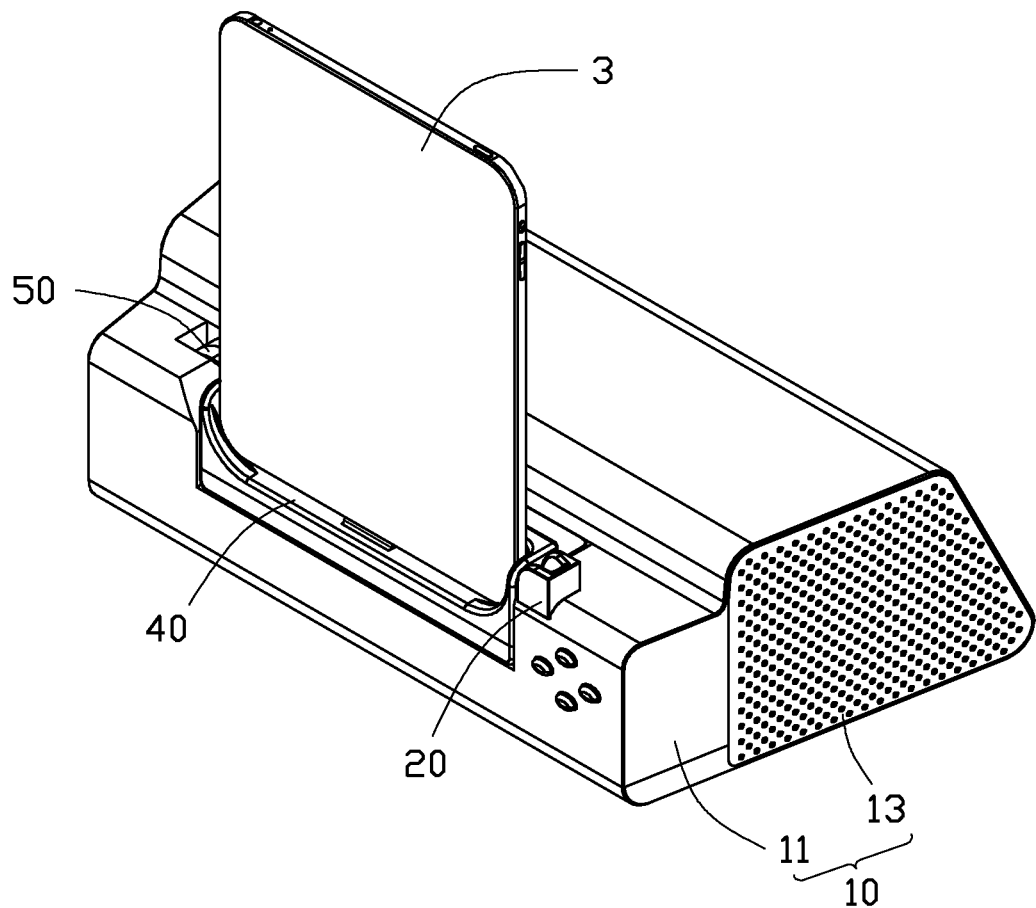
FIG. 1 is an assembled, isometric view of a consumer electronic product assembly according to an exemplary embodiment of the present disclosure.
Figure 2:
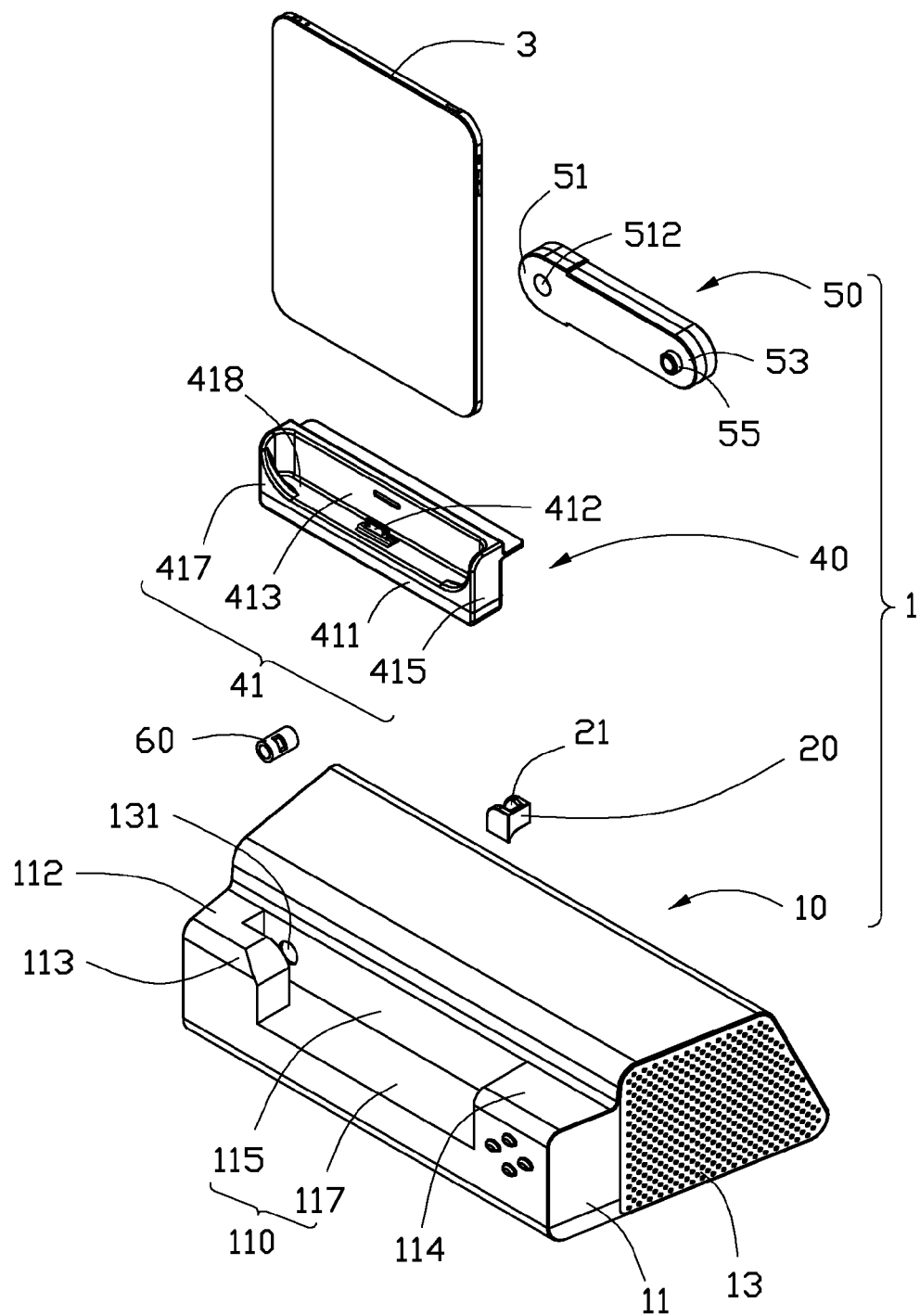
FIG. 2 is an exploded view of the consumer electronic product assembly of FIG. 1.

Referring to FIGS. 1-2, a consumer electronic product assembly is shown. The consumer electronic product assembly includes a consumer electronic product 3, and a bracket 1 holding the consumer electronic product 3.

In the description that follows, the stated orientations of all of the elements of the consumer electronic product assembly are with reference to the orientations of all of the elements as shown in FIG. 1.

Referring to FIG. 1 and FIG. 2, the consumer electronic product 3 is a portable AV product, such as an LCD, portable DVD player, iPAD, mobile phone, etc. In this embodiment, the consumer electronic product 3 is thin and rectangular.

The bracket 1 includes a supporting seat 10, a holding member 40, and a connecting bar 50. The holding member 40 holds the consumer electronic product 3 therein. The connecting bar 50 hinges on the holding member 40 and the supporting seat 10, respectively. The connecting bar 50 is pivotable with respect to the supporting seat 10, and the holding member 40 is pivotable with respect to the connecting bar 50, whereby the consumer electronic product 3 can be adjusted to various positions with respect to the supporting seat 10.

The supporting seat 10 includes an engaging portion 11, and an extending portion 13 extending from a front side of the engaging portion 11. The engaging portion 11 is a generally cubic, and defines an elongated receiving groove 110 in a middle thereof along a longitudinal axis thereof. Opposite ends of the receiving groove 110 terminate near each of opposite ends of the engaging portion 11. A first shoulder 112 and a second shoulder 114 are formed on left and right ends of the engaging portion 11, respectively, at opposite ends of the receiving groove 110. The first shoulder 112 and the second shoulder 114 are generally cubic. A baffle plate 113 extends inward from the rear end of the first shoulder 112. The baffle plate 113 is generally rectangular. An inner end of the baffle plate 113 is spaced from and faces an inner end of the second shoulder 114. A front surface of the baffle plate 113 is spaced from the extending portion 13. The receiving groove 110 can be considered to be divided into a first receiving groove 115 and a second receiving groove 117 by the baffle plate 113. The first receiving groove 115 is between the first shoulder 112 and the second shoulder 114. The second receiving groove 117 is between the baffle plate 113 and the second shoulder 114. A blind hole (not shown) is defined in the front side of the baffle plate 113.

A cross section of the extending portion 13 is a trapezoid. A width of the extending portion 13 gradually increases from rear to front. A rear end of the extending portion 13 extends from a front end of the engaging portion 11 and covers a front side of the first receiving groove 115. A blind hole 131 is defined in the rear end of the extending portion 13, and is aligned with the blind hole of the baffle plate 113. The extending portion 13 can be used to amplify a sound signal of the consumer electronic product 3.

A block 20 is mounted on a rear side of the inner end of the second shoulder 114. A U-shaped slit 21 is defined in a central portion of the block 20, to receive a part of the consumer electronic product 3 therein.

The holding member 40 includes a casing 41, and a front plate 43 extending from the casing 41. The casing 41 includes an elongated bottom plate 411, a first sidewall 413, two second sidewalls 415, and two third sidewalls 417. The first sidewall 413 is elongated and extends up from a front side of the bottom plate 411. The two second sidewalls 415 extend up from opposite lateral ends of the bottom plate 411, respectively. The two third sidewalls 417 are spaced from each other, and extend up from opposite ends of a rear side of the bottom plate 411, respectively. The third sidewalls 417 are spaced from and parallel to the first sidewall 413. Each of the second sidewalls 415 adjoins a respective outer end of the first sidewall 413 and a corresponding third sidewall 417. The bottom plate 411, first sidewall 413, second sidewalls 415 and third sidewalls 417 cooperatively define a receiving chamber 418 to receive a bottom end of the consumer electronic product 3. An electrical connecter 412 protrudes up from a middle of the bottom plate 411, to engage in the consumer electronic product 3 and electrically connect with the consumer electronic product 3. A front side of the first sidewall 413 defines a blind hole 414 to engage the connecting bar 50. The front plate 43 is elongated, and extends forward from a top end of the first sidewall 413.

The connecting bar 50 is flat and elongated, and includes a first end 51 and a second end 53 opposite to the first end 51. Endmost surfaces (not labeled) of the first end 51 and the second end 53 are rounded. A through hole 512 is defined in a middle of the first end 51. A pin 55 protrudes rearward from a middle of the second end 53. The connecting bar 50 is shorter than the front plate 43 of the holding member 40. A front-to-back width of the front plate 43 exceeds a corresponding thickness of the connecting bar 50.

Figure 3:
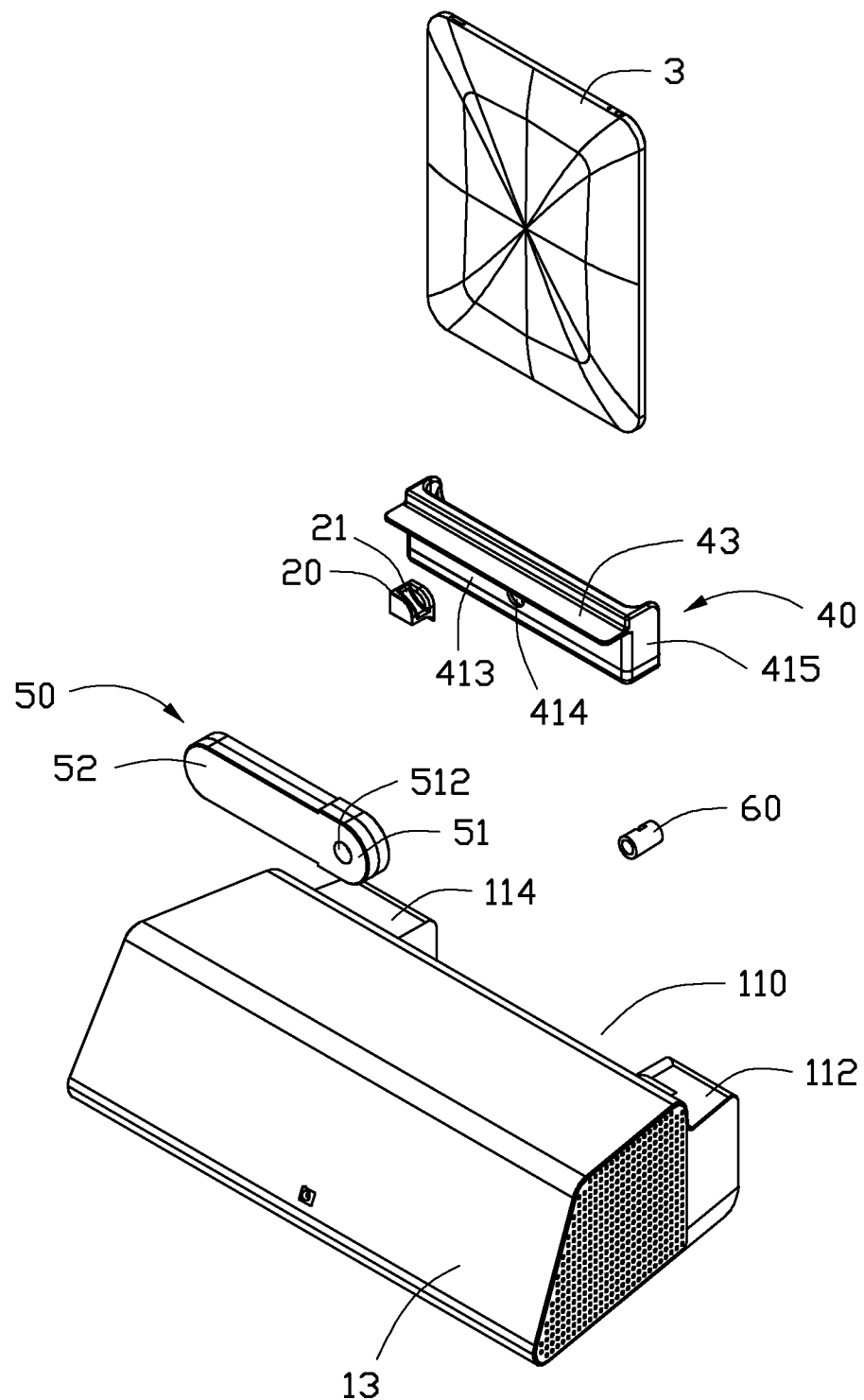
FIG. 3 is similar to FIG. 2, but with the consumer electronic product assembly shown from another aspect.
Figure 4:
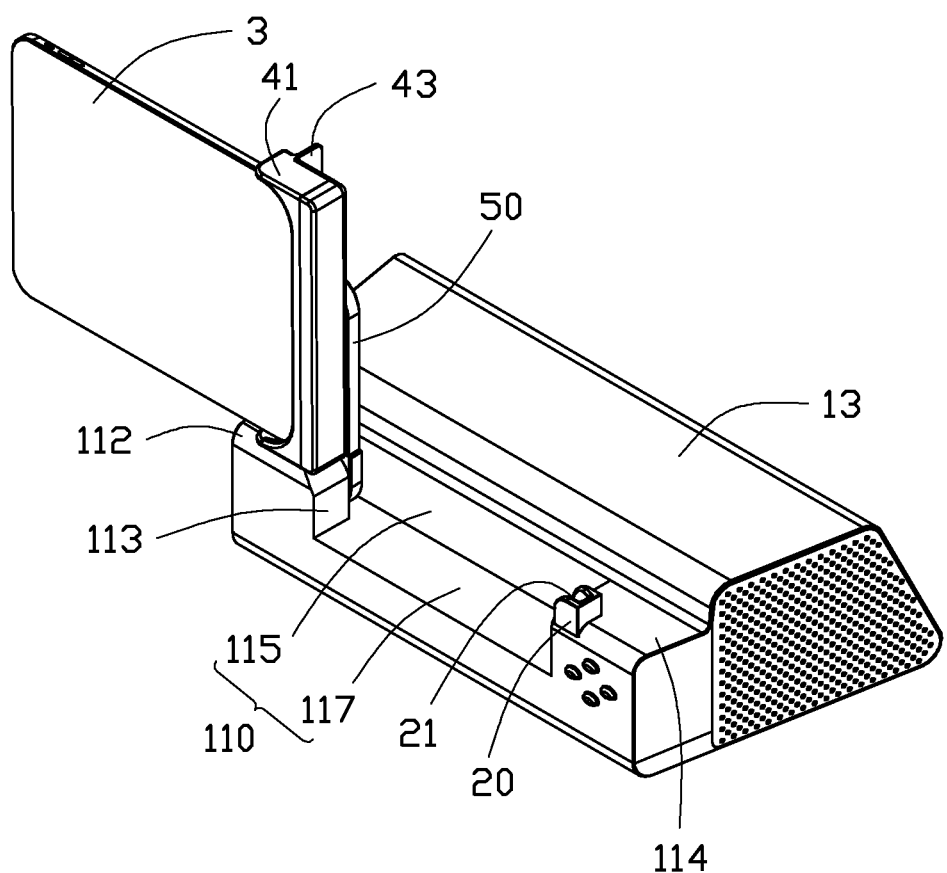
FIGS. 4-7 are various isometric views of a consumer electronic product of the consumer electronic product assembly adjusted to different positions with respect to a supporting seat of a bracket of the consumer electronic product assembly.
Figure 5:
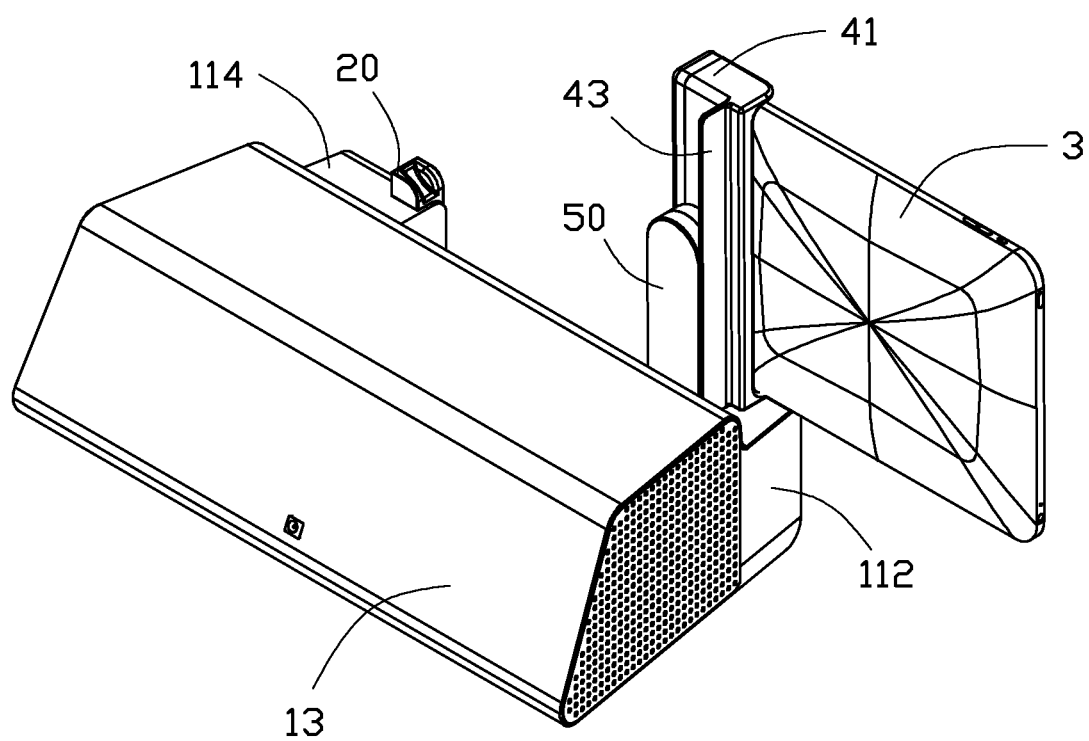

Referring also to FIGS. 3-5, when the bracket 1 is assembled, a pin 60 is received in the through hole 512 of the first end 51 of the connecting bar 50. Opposite ends of the pin 60 exceed opposite front and rear sides of the first end 51. Then the first end 51 is received in the first receiving groove 115 of the engaging portion 11 of the supporting seat 10; and opposite ends of the pin 60 are received in the blind hole of the baffle plate 113 and the blind hole 131 of the extending portion 13 of the supporting seat 10, respectively. Therefore, the connecting bar 50 is mounted on the supporting seat 10 and is rotatable with respect to the supporting seat 10. The pin 55 of the second end 53 of the connecting bar 50 is received in the blind hole 414 of the first sidewall 413 of the casing 41 of the holding member 40. Thereby, the connecting bar 50 and the holding member 40 are assembled together. The second end 53 of the connecting bar 50 is located below the front plate 43 of the holding member 40. The connecting bar 50 is rotatable with respect to the holding member 40. Finally, the block 20 is mounted on the second shoulder 114, with the slit 21 facing towards the first shoulder 112. In this state, the bracket 1 is completely assembled.

The bottom end of the consumer electronic product 3 is received in the receiving chamber 418 of the casing 41 of the holding member 40, with the connecter 412 engaging in the consumer electronic product 3. Thereby, the consumer electronic product 3 is assembled on the holding member 40. In this state, the consumer electronic product assembly is completely assembled.

When the consumer electronic product assembly is used, a position of the consumer electronic product 3 is adjustable with respect to the supporting seat 10. As shown in FIG. 1, when the consumer electronic product 3 is located at a first position, the casing 41 of the holding member 40 is fully received in the second receiving groove 117 of the engaging portion 11. The connecting bar 50 is aligned with and abuts the first sidewall 413 of the casing 41. The connecting bar 50 is essentially received in a left side of the first receiving groove 115 of the engaging portion 11 of the supporting seat 10. In the illustrated embodiment, the consumer electronic product 3 when in the first position is oriented vertically.

Figure 6:
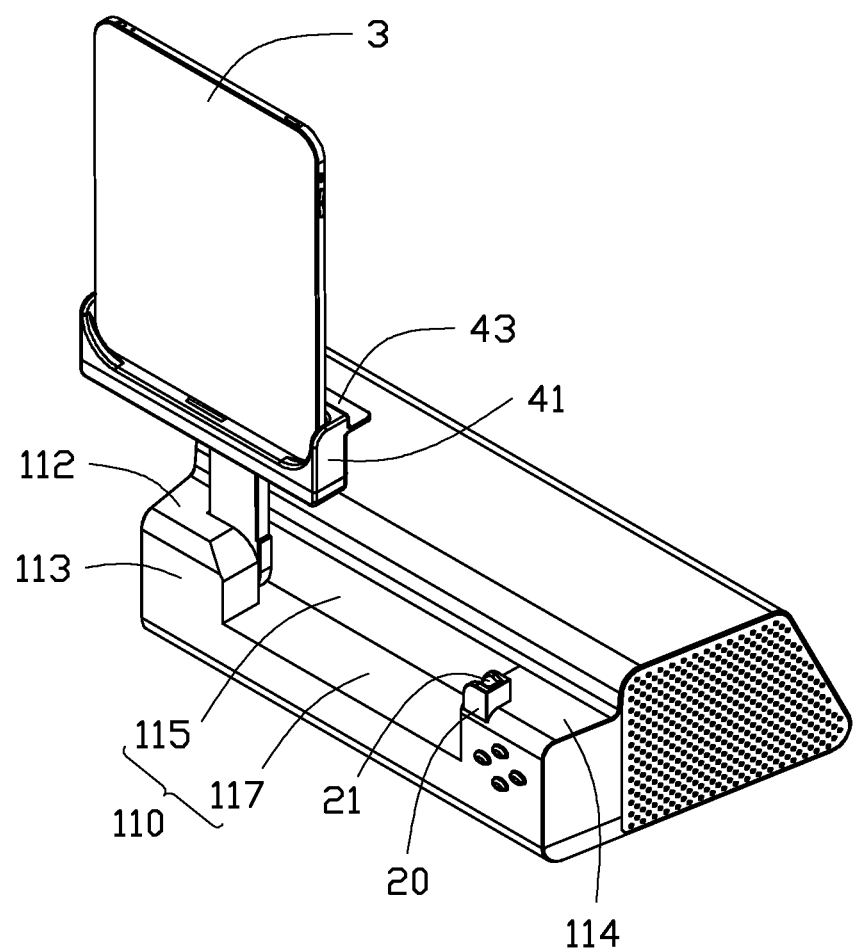
Figure 7:
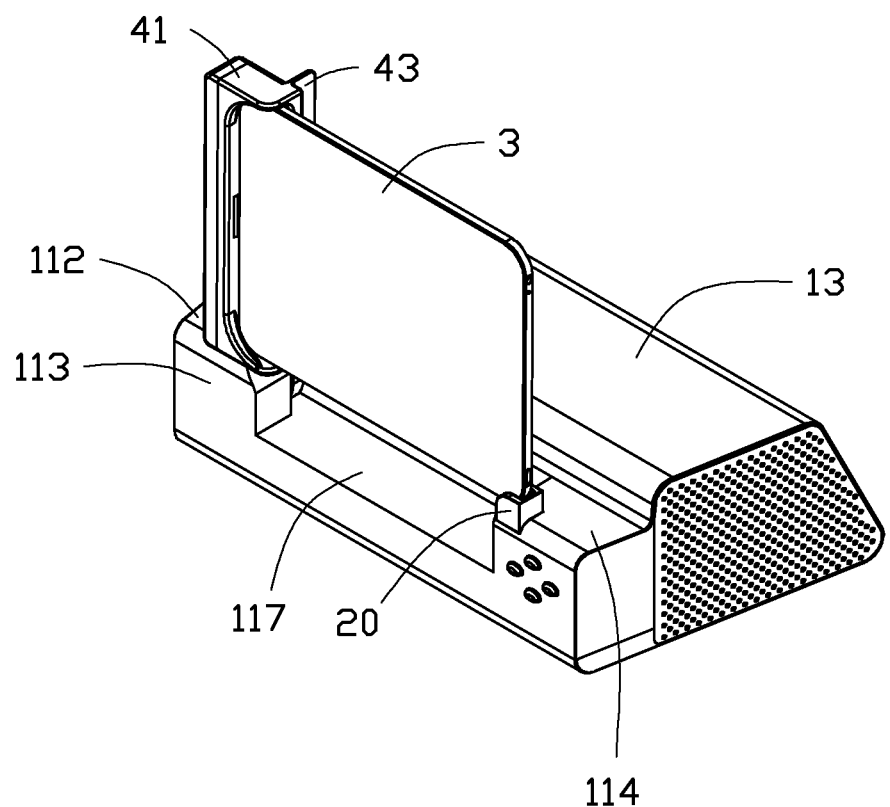

Referring also to FIGS. 4-7, when the consumer electronic product 3 needs to be adjusted to a second position, typically, the casing 41 is pulled up to make the casing 41 rotate up and away from the second receiving groove 117. In particular, the casing 41 rotates about the pin 60 and simultaneously causes the connecting bar 50 to rotate in unison with the casing 41. Thus, the second end 53 of the connecting bar 50 rotates up and away from the first receiving groove 115, until the connecting bar 50 is upright and the consumer electronic product 3 is oriented horizontally (as shown in FIGS. 4-5). Then, the casing 41 is rotated about the pin 60 with respect to the connecting bar 50. In particular, the casing 41 rotates up and to the right to an intermediate position (as shown in FIG. 6), and continues to rotate down and to the right until the consumer electronic product 3 is again oriented horizontally, parallel to the supporting seat 10 (as shown in FIG. 7). In this state, the consumer electronic product 3 is in the second position. A long side of the consumer electronic product 3 spans across the second receiving groove 117, a corner of the consumer electronic product 3 is received in the slit 21 of the block 20 and rests on a bottom end of the block 20, and the right one of the second sidewalls 415 of the casing 41 abuts the baffle plate 113 of the engaging portion 11.

In this way, the consumer electronic product 3 can be adjusted to various positions with respect to the supporting seat 10.

It is to be understood, however, that even though numerous characteristics and advantages of the exemplary embodiment(s) have been set forth in the foregoing description, together with details of the structures and functions of the embodiment(s), the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A bracket for a consumer electronic product, the bracket comprising:
    a supporting seat comprising a first shoulder, a second shoulder away from the first shoulder, and a block with a slit protruding from the second shoulder;
    a holding member adapted for holding a consumer electronic product; and
    a connecting bar, opposite ends of the connecting bar hinged on the holding member and the first shoulder of the supporting seat, respectively;
    wherein the connecting bar is pivotable with respect to the supporting seat, and the holding member is pivotable with respect to the connecting bar, whereby the holding member can be adjusted to various positions with respect to the supporting seat; and
    wherein the first shoulder supports the holding member when the consumer electronic product rotates with the connecting bar and the holding member to a first position, and the block is adapted for receiving a part of the consumer electronic product in the slit when the consumer electronic product rotates with the connecting bar and the holding member to a second position.

2. The bracket of claim 1, wherein the holding member comprises a casing adapted for holding the consumer electronic product, and the casing is hinged on one of the opposite ends of the connecting bar.

3. The bracket of claim 2, wherein a receiving chamber is defined in the casing for receiving an end of the consumer electronic product therein.

4. The bracket of claim 2, wherein the holding member further comprises a front plate extending outwardly from the casing, and the connecting bar is located below the front plate when the holding member is oriented horizontally.

5. The bracket of claim 1, wherein a first receiving groove and a second receiving groove are defined in the supporting seat, the first receiving groove is used to receive the connecting bar therein, and the second receiving groove is used to receive the holding member therein.

6. A consumer electronic product assembly comprising:
    a consumer electronic product; and
    a bracket holding the consumer electronic product, the bracket comprising:
    a supporting seat comprising a first shoulder, a second shoulder away from the first shoulder, and a block with a slit protruding from the second shoulder;
    a holding member holding the consumer electronic product; and
    a connecting bar, opposite ends of the connecting bar hinged on the holding member and the first shoulder of the supporting seat, respectively;
    wherein the connecting bar is rotatable with respect to the supporting seat, and the holding member is rotatable with respect to the connecting bar, whereby the consumer electronic product held by the holding member can be adjusted to various positions with respect to the supporting seat; and wherein when the consumer electronic product rotates with the connecting bar and the holding member to a first position, the holding member abuts the first shoulder; and when the consumer electronic product rotates with the connecting bar and the holding member to a second position, a part of the consumer electronic product is received in the slit.

7. The consumer electronic product assembly of claim 6, wherein the holding member comprises a hollow casing and an end of the consumer electronic product is received in the casing.

8. The consumer electronic product assembly of claim 7, wherein an electrical connecter protrudes from the casing and enters the consumer electronic product.

9. The consumer electronic product assembly of claim 7, wherein the holding member further comprises a front plate extending outwardly from a side of the casing, and the front plate is located below the connecting bar to abut the connecting bar.

10. The consumer electronic product assembly of claim 6, wherein the supporting seat comprises an engaging portion with a first receiving groove and a second receiving groove, the first receiving groove is used to receive the connecting bar therein, and the second receiving groove is used to receive the holding member therein.

11. The consumer electronic product assembly of claim 10, wherein the first shoulder and the second shoulder are formed on opposite ends of the first and second receiving grooves.

12. The consumer electronic product assembly of claim 11, wherein a baffle plate extends from the first shoulder and is spaced from the second shoulder, the baffle plate and the second shoulder are located at opposite sides of the second receiving groove, and one end of the connecting bar is received in the first receiving groove and pivotally engages with the baffle plate and a sidewall of the engaging portion.

13. The consumer electronic product assembly of claim 10, wherein the supporting seat further comprises an extending portion extending from the engaging portion.

14. The consumer electronic product assembly of claim 6, wherein the connecting bar is elongated and flat.

* * * * *